United States Patent
Miyashita

(10) Patent No.: US 8,230,746 B2
(45) Date of Patent: Jul. 31, 2012

(54) COMBINED TYPE PRESSURE GAUGE, AND MANUFACTURING METHOD OF COMBINED TYPE PRESSURE GAUGE

(75) Inventor: Haruzo Miyashita, Fujiyoshida (JP)

(73) Assignee: Canon Anelva Corporation, Kawasaki-shi (JP)

( * ) Notice: Subject to any disclaimer, the term of this patent is extended or adjusted under 35 U.S.C. 154(b) by 52 days.

(21) Appl. No.: 13/020,506

(22) Filed: Feb. 3, 2011

(65) Prior Publication Data

US 2011/0209554 A1 Sep. 1, 2011

(30) Foreign Application Priority Data

Feb. 26, 2010 (JP) ................................. 2010-041197

(51) Int. Cl.
*G01L 9/12* (2006.01)
(52) U.S. Cl. ............................................ 73/718; 73/724
(58) Field of Classification Search ............. 73/700–756
See application file for complete search history.

(56) References Cited

U.S. PATENT DOCUMENTS

| | | | | |
|---|---|---|---|---|
| 2,678,986 A | * | 5/1954 | Ward ............................... | 338/36 |
| 4,682,503 A | * | 7/1987 | Higashi et al. .................. | 73/755 |
| 5,962,791 A | | 10/1999 | Walchli et al. .................. | 73/755 |
| 6,619,131 B2 | | 9/2003 | Walchli et al. | |
| 6,672,171 B2 | * | 1/2004 | Gu et al. ........................ | 73/724 |
| 7,278,322 B1 | * | 10/2007 | Lantz ............................... | 73/754 |
| 2003/0010129 A1 | * | 1/2003 | Gu et al. ........................ | 73/716 |
| 2008/0115585 A1 | * | 5/2008 | Miyashita et al. .............. | 73/755 |
| 2009/0056464 A1 | * | 3/2009 | Qader et al. .................... | 73/755 |
| 2009/0199649 A1 | * | 8/2009 | Kawasaki ....................... | 73/755 |
| 2010/0132475 A1 | * | 6/2010 | Kawasaki ....................... | 73/755 |
| 2010/0154552 A1 | | 6/2010 | Miyashita | |

FOREIGN PATENT DOCUMENTS

JP 2002-520613 T 7/2002
JP 2008-209284 A 9/2008

* cited by examiner

*Primary Examiner* — Andre Allen
(74) *Attorney, Agent, or Firm* — Fitzpatrick, Cella, Harper & Scinto

(57) ABSTRACT

The present invention allows manufacturing of a capacitive diaphragm pressure gauge and a Pirani pressure gauge on a single silicon substrate, which makes it possible to reduce the manufacturing cost by the miniaturization of products and mass production. According to an embodiment of the present invention, the manufacturing method of a combined type pressure gauge is a manufacturing method of a combined type pressure gauge including a capacitive diaphragm pressure gauge and a Pirani pressure gauge, the method including a groove-forming step of forming a first groove portion and a second groove portion on a first surface side of a silicon substrate by etching, and a bonding step to bond a glass substrate to the silicon substrate so as to cover the first groove portion and the second groove portion on the first surface side of the silicon substrate.

7 Claims, 5 Drawing Sheets

COMBINED TYPE PRESSURE GAUGE, AND MANUFACTURING METHOD OF COMBINED TYPE PRESSURE GAUGE

CROSS-REFERENCES TO RELATED APPLICATIONS

This application claims the benefit of priority from Japanese Patent Application No. 2010-041197 filed Feb. 26, 2010, the entire contents of which is incorporated herein by reference.

BACKGROUND OF THE INVENTION

1. Field of the Invention

The present invention relates to a combined type pressure gauge, and the manufacturing method of the combined type pressure gauge.

2. Description of the Related Art

In the pressure gauge described in Japanese Unexamined Patent Application Publication (Translation of PCT Application) No. 2002-520613, a protective tube having a flange for being connected to a vacuum apparatus etc. and a supporting plate are welded via an elastic spring. To the supporting plate, a diaphragm made of ceramic is arranged via a glass seal tube, and the space surrounded by these forms a reference vacuum chamber. Here, when gas pressure is applied to the diaphragm from the outside, the diaphragm is deflected to the reference vacuum chamber side. On the diaphragm and the surface of the supporting plate of the reference vacuum chamber side, electroconductive electrodes are formed, respectively, and, by measuring the capacitance between both electrodes, the gas pressure can be measured.

Furthermore, to the pressure gauge of the related art, a protective ring is arranged so as to surround the diaphragm, and, to the outside thereof, two filaments, which are fixed by supporting poles, are arranged. The filament is a constituent of a Pirani pressure gauge, wherein the pressure can be measured from the amount of heat of the filament taken away by the gas (The filament is made of a material of platinum, tungsten or nickel, or an alloy containing at least one of these metals, and the resistivity of the filament changes significantly in accordance with the temperature. That is, the resistivity thereof depends on the amount of heat that is taken away from the filament by the gas, that is, the pressure of the gas). In addition, a system is created in which the electric information of the Pirani pressure gauge is output to the outside from a electrical terminal different from the electrical terminal of the capacitive pressure gauge, and in which the electric information is transformed to electric information corresponding to the gas pressure by an electric circuit and is finally displayed as a pressure value.

Japanese Patent Application Laid-open Publication No. 2008-209284 discloses the production of the Pirani pressure gauge and a diaphragm pressure gauge by using a MEMS (Micro-Electro-Mechanical Systems) technology as a pressure measurement apparatus.

The combined type pressure gauge in Japanese Unexamined Patent Application Publication (Translation of PCT Application) No. 2002-520613 is, however, one formed by arranging a capacitive pressure gauge and a Pirani pressure gauge, formed through separate manufacturing processes, simply assemble together. Accordingly, the cost reduction effect upon the production is low. Moreover, since two pressure gauges are arranged in a small place, the lowering of manufacturing efficiency or, potentially, the lowering of yield is caused to thereby increase the manufacturing cost, occasionally.

Japanese Patent Application Laid-open Publication No. 2008-209284 does not disclose a specific manufacturing method of producing simultaneously a Pirani pressure gauge and a diaphragm pressure gauge on the same substrate. Therefore, the processes to from these gauges cannot be efficient and the manufacturing cost cannot also be reduced.

SUMMARY OF THE INVENTION

The present invention has been made in view of the above problems involved in conventional combined type pressure gauges and manufacturing methods thereof, and aims at providing a combined type pressure gauge that reduces the manufacturing cost and has a reduced size, and the manufacturing method thereof.

A first aspect of the present invention is a manufacturing method of a combined type pressure gauge including a capacitive diaphragm pressure gauge and a Pirani pressure gauge, the manufacturing method comprising: a groove-forming step of forming a first groove portion for forming a diaphragm of the capacitive diaphragm pressure gauge on a first surface side of a first substrate, and a second groove portion, which is positioned adjacent to the first groove portion, for forming a filament of the Pirani pressure gauge, on the first surface side of the first substrate, and a bonding step of bonding a second substrate having an electrode to the first substrate so as to at least cover the first groove portion on the first surface side of the first substrate, to seal hermetically the inside of the first groove portion and not to seal hermetically the inside of the second groove portion, wherein the second substrate is joined to the first substrate so that a surface of the second substrate where the electrode is formed faces a bottom surface of the first groove portion, the manufacturing method furthermore comprising the steps of: forming a third groove portion in a region opposite to the first groove portion on a second surface side of the first substrate opposite to the first surface, before the groove-forming step, between the groove-forming step and the joining step, or after the joining step, and forming the filament in the second groove portion after the groove-forming step, and wherein the first groove portion and the third groove portion are formed so that a region between the bottom surface of the first groove portion and a bottom surface of the third groove portion constitutes the diaphragm.

Additionally, a second aspect of the present invention is a combined type pressure gauge including a capacitive diaphragm pressure gauge having a diaphragm and a Pirani pressure gauge having a filament, comprising: a first substrate, a first groove portion formed on a first surface side of the first substrate, a second groove portion which is formed on the first surface side of the first substrate and which is adjacent to the first groove portion, a third groove portion formed in a region opposite to the first groove portion on a second surface side opposite to the first surface of the first substrate, and a second substrate having an electrode, and wherein: the second substrate is joined to the first substrate so as to at least cover the first groove portion, to seal hermetically the inside of the first groove portion, not to seal hermetically the inside of the second groove portion, and so that a surface of the second substrate where the electrode is formed faces a bottom surface of the first groove portion, a region between the bottom surface of the first groove portion and a bottom surface of the third groove portion constitutes the diaphragm, and the filament is formed in the second groove portion.

The compound type pressure gauge according to the present invention can realize a pressure gauge having a small size and capable of measuring a wide range of pressure with a high accuracy. In more detail, the manufacturing method of the compound type pressure gauge according to the present invention allows manufacturing of a capacitive diaphragm pressure gauge and a Pirani pressure gauge on a single silicon substrate by a micromachining technology, which makes it possible to downsize products and to reduce the manufacturing cost by mass production. Moreover, in the process of manufacturing the combined type pressure gauge of the present invention, too, it is possible to process and manufacture simultaneously both pressure gauges, which makes it possible to design the manufacturing process to be common. Therefore, as compared with conventional processes in which respective pressure gauges are manufactured separately and, after that, are united and assembled, it becomes possible to shorten considerably the manufacturing process, which also makes it possible to obtain a large effect in terms of reducing the manufacturing cost.

DETAILED DESCRIPTION OF THE INVENTION

In recent years, the advance of a micromachine (Microelectro Mechanical Systems: MEMS) technology has enabled manufacturing of fine mechanical structures in a large amount with a low cost. The technology is also applied to the manufacturing technology of pressure gauges, and the capacitive pressure gauge and the Pirani pressure gauge may also be manufactured by a micromachine technology. An embodiment of the present invention is the manufacturing method of a combined type pressure gauge in which a single substrate is processed to give a combined type pressure gauge by a manufacturing process using the MEMS technology, instead of manufacturing separately both pressure gauges to assemble them as one combined type pressure gauge. That is, an embodiment of the present invention is the manufacturing method of a combined type pressure gauge in which the manufacturing process of both pressure gauges is made common to enable the combined type pressure gauge to be manufactured efficiently, to simplify the arrangement process of both pressure gauge elements, and to thereby reduce the manufacturing cost and assembling cost.

Hereinafter, using FIGS. 1 to 3, the structure of a combined type pressure gauge according to an embodiment of the present invention will be explained.

Figure 1:
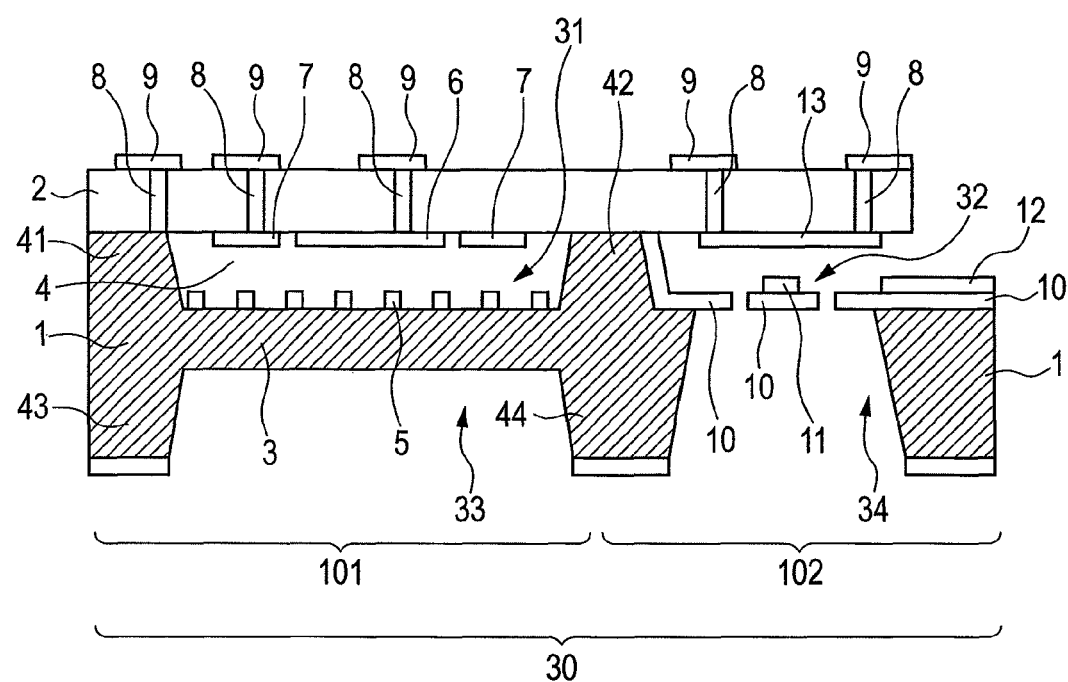
FIG. 1 is a cross-sectional view showing a combined type pressure gauge according to an embodiment of the present invention.

FIG. 1 is a cross-sectional view of a combined type pressure gauge 30 according to an embodiment of the present invention. FIG. 2 is a perspective view showing the constitution of the combined type pressure gauge 30 seen from the top. FIG. 3 is a perspective view showing the constitution of the combined type pressure gauge 30 seen from the bottom.

As shown in FIG. 1, the combined type pressure gauge 30 has a capacitive diaphragm pressure gauge 101 and a Pirani pressure gauge 102.

The capacitive diaphragm pressure gauge 101 has a diaphragm 3 structure and is based on the principle that gas pressure applied to the diaphragm 3 bends the diaphragm 3, and that the amount of bending thereof is detected from the capacitance with respect to a capacitance electrode 6 facing the diaphragm 3 and is converted to pressure. The capacitive pressure gauge 101 measures directly a phenomenon caused by the pressure of a gas. Therefore, it can measure the pressure with a high degree of accuracy independent of the kind of gasses. Moreover, the measurement region of the gas pressure can be changed by changing the thickness or size of the diaphragm 3.

In the capacitive diaphragm pressure gauge 101, however, the diaphragm 3 may change the amount of bending based on not only the change of the gas pressure but also the difference in thermal expansion coefficients of the diaphragm 3 and surrounding materials supporting the diaphragm 3, which might cause the measurement error. In particular, the diaphragm 3 has generally a thickness of 100 μm or less in order to measure a pressure of one tenth, or one hundredth or less of the atmospheric pressure (10000 Pa or less), which requires a high level of mechanical processing precision to thereby increase the manufacturing cost.

In contrast, the Pirani pressure gauge 102 is a pressure gauge that operates by using a phenomenon that the thermal conductivity of a gas changes depending on the gas pressure. For example, by applying a constant current to a filament 11 made of platinum, tungsten, nickel or an alloy material thereof, the filament 11 is heated to raise the temperature. When gas exists around the filament at this time, the gas takes away the heat to thereby lower the filament temperature. In addition, platinum, tungsten, nickel and alloy materials thereof being filament materials have larger variation of the resistivity relative to the temperature change thereof, that is, lager temperature coefficient, as compared with other metals. Therefore, the pressure of gas can be known from the variation of the resistivity thereof. In other words, the Pirani pressure gauge 102 can easily measure the gas pressure of about 0.001 to 10000 Pa with such a simple structure.

On the other hand, the thermal conductivity differs depending on the kind of gasses. Therefore, in order to know precise pressure, measured values have to be corrected in accordance with the kind of gases, and, since the thermal conductivity change of gases relative to the pressure change hardly varies and becomes saturated in pressure regions near the atmospheric pressure, the Pirani pressure gauge is not suitable for the measurement at near-atmospheric pressure.

Accordingly, the present invention uses a combined type pressure gauge, in which the capacitive diaphragm pressure gauge which does not depends on the kind of gases to be measured and can measure the pressure with a high degree of accuracy even at near-atmospheric pressure where the change of the thermal conductivity of a gas reaches a saturated state and the Pirani pressure gauge which can measure the pressure in the same constitution independent of the measurement pressure and can avoid the increase in the manufacturing cost even at a lower pressure, are incorporated, and uses properly the measurement by the capacitive diaphragm pressure gauge or the measurement by the Pirani pressure gauge depending on the pressure to be measured. That is, in the present embodiment, a wide range of pressure from 0.001 Pa to the atmospheric pressure can be measured by measuring pressures higher than one tenth or one hundredth of the atmospheric pressure with the capacitive diaphragm pressure gauge 101, and by measuring pressures less than or equal to that with the Pirani pressure gauge 102.

Hereinafter, the detailed constitution of the capacitive diaphragm pressure gauge 101 will be explained. As shown in FIG. 1, plural groove portions (concavo-convex portions) are formed in both surfaces of the silicon substrate 1. Specifically, between a concave portion (first groove portion) 31 provided on a first surface side (glass substrate side) of the silicon substrate 1 and a concave portion (third groove portion) 33 provided at a position corresponding to (opposite to) the concave portion (first groove portion) 31 on a second surface side of the silicon substrate 1, the diaphragm 3 is formed. That is, the region between the bottom surface of the concave portion (first groove portion) 31 and the bottom surface of the concave portion (third groove portion) 33 of the silicon substrate 1 constitutes the diaphragm 3. Accordingly, the depths of the concave portion (first groove portion) 31 and the concave portion (third groove portion) 33 are preset so that the thickness of the above-described region (the region that constitutes the diaphragm 3) between the bottom surface of the concave portion (first groove portion) 31 and the bottom surface of the concave portion (third groove portion) 33 has a thickness so that the region has the flexibility or changes the shape thereof by the pressure to be measured.

Meanwhile, in the present embodiment, the silicon substrate 1 is a silicon substrate having a low resistivity. Thus, the diaphragm 3 is electrically conductive.

On the convex portions 41 and 42 on the first surface side of the silicon substrate 1, a glass substrate 2 is bonded, and completely adhered and fixed. Between the concave portion (first groove portion) 31 and the glass substrate 2, a reference pressure chamber 4 is formed. The reference pressure chamber 4 is in a state of being sealed in a high vacuum, and, although not shown, a nonvolatile getter to absorb remaining gas is arranged inside the reference pressure chamber 4.

Figure 2:
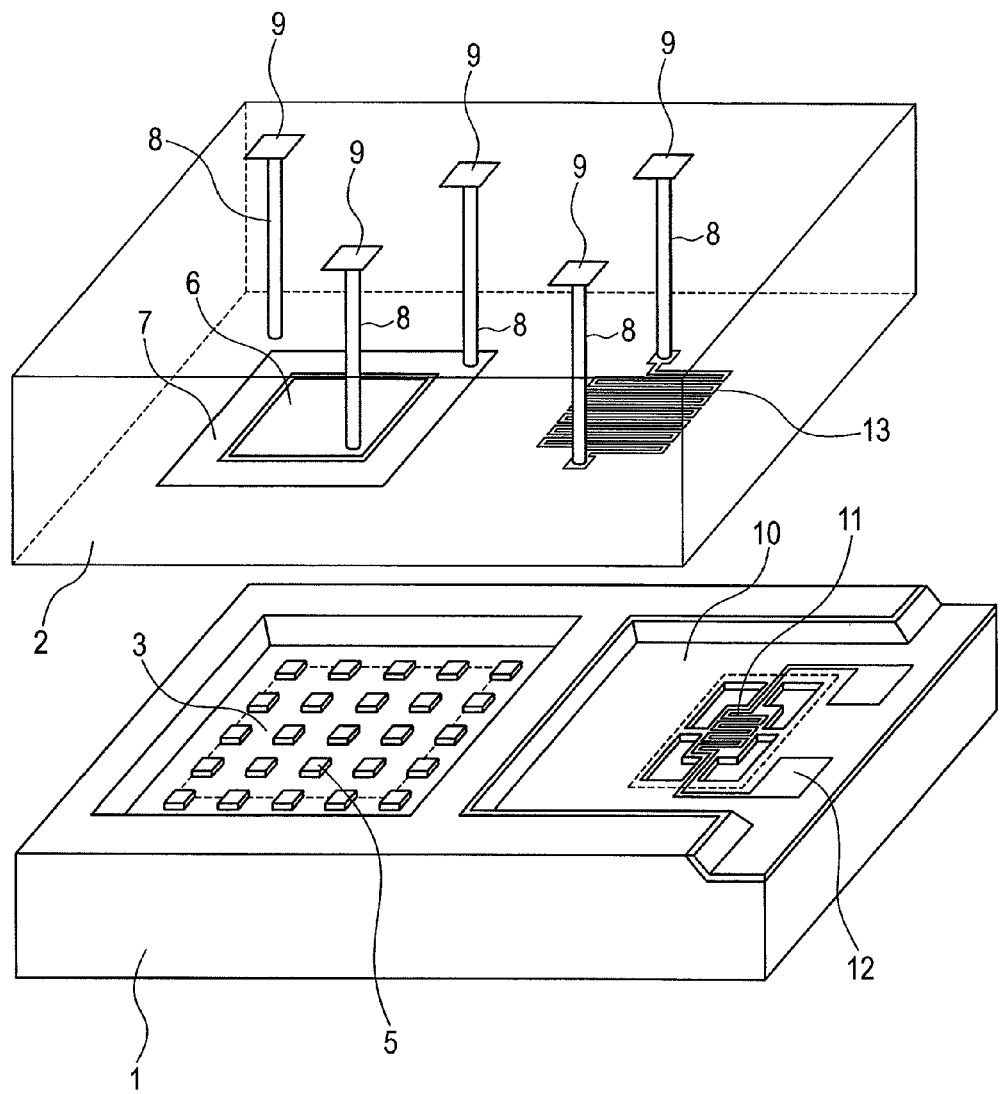
FIG. 2 is a perspective structural view showing a combined type pressure gauge according to an embodiment of the present invention.
Figure 3:
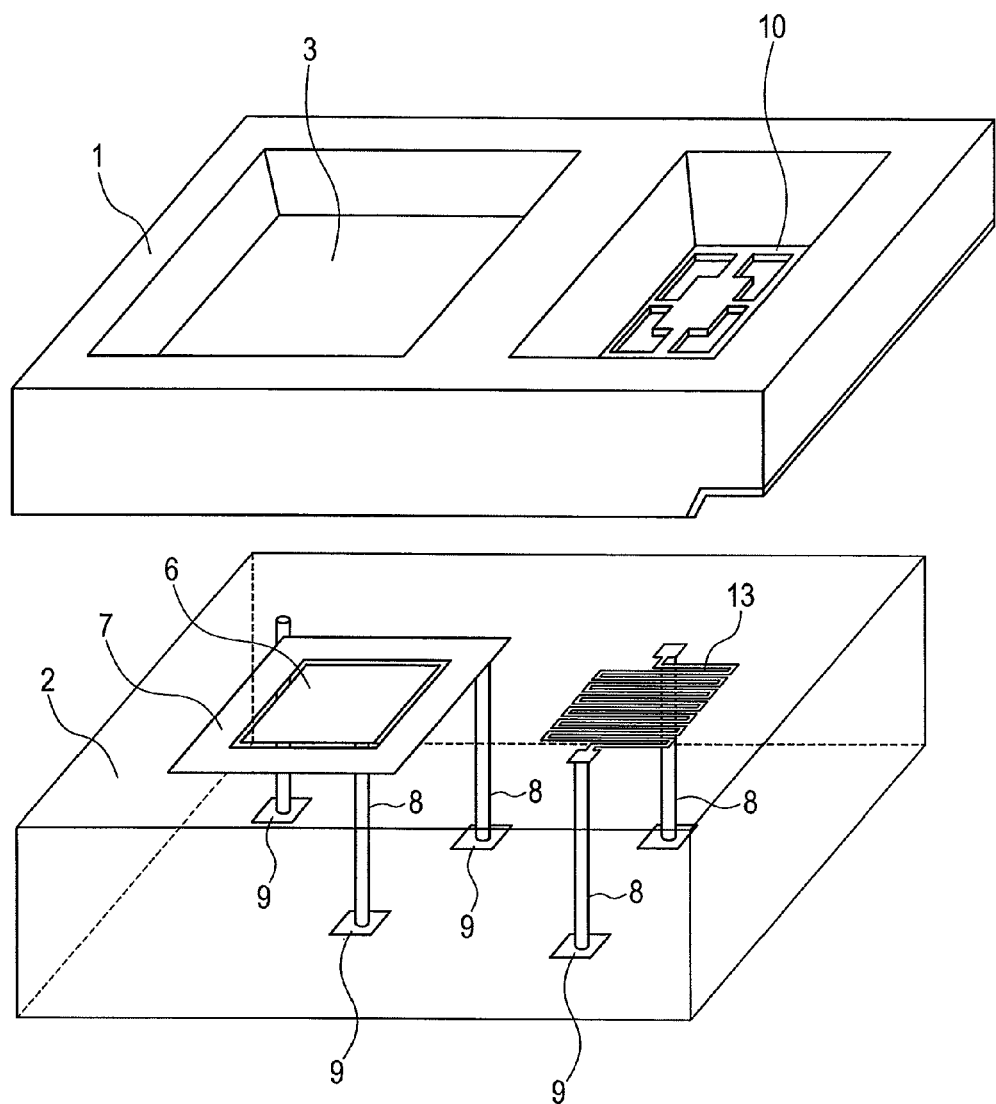
FIG. 3 is a perspective structural view showing a combined type pressure gauge according to an embodiment of the present invention.

As shown in FIG. 2, on the bottom surface of the concave portion 31 of the diaphragm 3, plural fine protruding structures 5 are formed in a state of being separated one another. When gas pressure is applied to the diaphragm 3 from the outside, the diaphragm 3 is deflected toward the glass substrate side, wherein the amount of deflection depends on the size and thickness of the diaphragm 3. For example, when a large gas pressure is applied to the diaphragm 3, the amount of bending of the diaphragm 3 becomes large, and plural fine protruding structures 5 possibly adhere closely to the capacitance electrode 6 or a reference electrode 7 arranged on the reference pressure chamber 4 side of the glass substrate. When the gas pressure becomes low again, the diaphragm 3 has to return to the initial position. But, when a weak adsorption force (for example, van der Waals' force) acts between the diaphragm 3 and the capacitance electrode 6 and reference electrode 7, the diaphragm 3 remains adhered closely to the electrodes and, as the result, it does not function as a pressure gauge. Protruding structures 5 has a function of avoiding this problem by making the contact area small between the diaphragm 3 and the capacitance electrode 6, and the diaphragm 3 and reference electrode 7.

In contrast, the aforementioned capacitance electrode 6 and reference electrode 7 are arranged on the reference pressure chamber 4 side of glass substrate 2 so as to face the diaphragm 3 when the silicon substrate 1 and the glass substrate 2 are bonded. In the present embodiment, the capacitance electrode 6 is provided so as to face the diaphragm 3 near the center thereof, and the reference electrode 7 is provided so as to face the outside of the diaphragm 3 (the sidewall side of the concave portion (first groove portion) 31). When gas pressure is applied to the diaphragm 3 from the outside, the diaphragm 3 deflects to the glass substrate side, and the capacitance between the diaphragm 3 and the capacitance electrode 6 increases. The gas pressure can be measured from the amount of increase. Incidentally, the capacitance between the diaphragm 3 and the reference electrode 7 also changes, but, since the reference electrode 7 is arranged at a position out of the center of the diaphragm 3, the capacitance does not change so much as that detected at the capacitance electrode 6. Practically, the pressure is often calculated from the capacitance change obtained by subtracting the capacitance change detected at the reference electrode 7 from the capacitance change detected at the capacitance electrode 6. This is because, since the capacitive diaphragm pressure gauge 101 has a problem of being susceptive to the influence of ambient temperature caused by the difference in thermal expansion coefficients of constituent materials, by subtracting the error based on the influence of ambient temperature included in the capacitance detected at the reference electrode 7 and the error based on the influence of the ambient temperature included in the capacitance detected at the reference electrode 7, the error component is reduced.

Meanwhile, in the present embodiment, the explanation is carried out based on the condition that the capacitance electrode 6, the reference electrode 7, and the diaphragm 3 have basically the shape of a square, but the shape is not particularly required to be limited, and another shape such as a circle causes no problem.

Moreover, in the present embodiment, it is important to change the capacitance between the diaphragm 3 and the capacitance electrode 6 by the deflection of the diaphragm 3. Therefore, an electroconductive member may be provided on the diaphragm 3.

Meanwhile, the electric signals of the diaphragm 3, the capacitance electrode 6, and the reference electrode 7 are transmitted to an electric circuit on the outside (not shown) through a feedthrough wiring 8 penetrating upper and lower surfaces of the glass substrate 2, and an electrode pad 9, and are electrically treated to obtain as a pressure value.

Next, the detailed constitution of the Pirani pressure gauge 102 will be explained.

On the first surface side of the silicon substrate 1, a concave portion (second groove portion) 32 is formed adjacent to the first groove portion 31 of the capacitive diaphragm pressure gauge 101. The concave portion (second groove portion) 32 is not a closed groove different from the aforementioned reference pressure chamber 4, but there exists an opening part completely penetrating in the thickness direction of the silicon substrate 1 (the direction from the first surface of the silicon substrate 1 toward the second surface), and an opening part formed by the notch of the silicon substrate 1. Further, the concave portion (second groove portion) 32 is wholly covered with an insulating film 10. A part of the insulating film 10 is not supported from the bottom part by the silicon substrate 1, and the part of the insulating film 10 (the part over the penetrating opening part of the insulating film 10) is in a completely floating state as a single film. Furthermore, apart of the insulating film 10 has a structure with an opening to form a communicating space from the upper surface of the silicon substrate 1 to the lower surface. On the insulating film 10 described above, a filament formed by platinum, nickel, tungsten or an alloy thereof as a material is formed. The filament 11 is formed by adjusting the shape, size and thickness in order to adjust a suitable length, area for heat-generation and resistivity. Both ends of the filament 11 are connected electrically to an electrode pad 12 on the insulating film, and, through the electrode pad 12 on the insulating film, power is supplied to the filament 11.

In addition, on the second surface side of the silicon substrate 1, a concave portion (fourth groove portion) 34 is provided at a position corresponding to (the position opposite to) the concave portion (second groove portion) 32.

In the bottom surface part of the glass substrate 2 facing the concave portion (second groove portion) 32 in which the filament 11 is formed, a temperature sensor 13 is formed. The temperature sensor 13, too, is preferably formed by a material having a large temperature coefficient of resistivity (for example, platinum), as is the case with the filament 11. The temperature sensor 13 works to measure the temperature of the inner wall of the groove in which the filament 11 is arranged, through the feedthrough wiring 8 penetrating the glass substrate 2.

On the lower surface side of the glass substrate 2, the temperature sensor 13 connected to the electrode pad 9 via the feedthrough wiring 8 is arranged while facing the filament 11.

The basic operation principle of the Pirani pressure gauge 102 is as described above, and, in order to improve the measurement accuracy of the pressure, it is very important to know the wall temperature of the space where the filament 11 is arranged, by the temperature sensor 13. That is, the gas exchanges the heat with the filament 11, and, at the same time, also exchanges heat with the wall surface of the space where the filament 11 is arranged. Therefore, practically, by measuring continually the difference between the temperature of the filament and the wall temperature of the space where the filament 11 is arranged, pressure measurement with a higher degree of accuracy can be carried out.

Meanwhile, in the present embodiment, the glass substrate 2 covers at least a part of the concave portion (second groove portion) 32, but the glass substrate 2 does not necessarily cover the concave portion (second groove portion) 32. For example, when the temperature sensor 13 is not provided, the glass substrate 2 may not cover the concave portion (second groove portion) 32.

As described above, in the present embodiment, adjacent two concave portions 31 and 32 are formed on the first surface of the single silicon substrate 1, wherein the bottom surface of the concave portion (first groove portion) 31 being one concave portion is formed to work as the diaphragm 3 and the concave portion (second groove portion) 32 being the other concave portion is provided with the filament 11, and the first surface and the glass substrate 2 are bonded so that the inside of the concave portion (first groove portion) 31 is hermetically sealed and the inside of the concave portion (second groove portion) 32 communicates with the circumference. Accordingly, the reference pressure chamber 4, which is a space surrounded by the concave portion (first groove portion) 31 and the glass substrate 2, is hermetically sealed and the concave portion (second groove portion) 32 is not sealed. Since the capacitance electrode 6 and the reference electrode 7 are positioned in the hermetically sealed reference pressure chamber 4, while using the silicon substrate 1 as a constituent element, both capacitive diaphragm pressure gauge 101 and Pirani pressure gauge 102 can be formed. Accordingly, the combined type pressure gauge of the present invention can be manufactured by processing the single silicon substrate 1 by using the MEMS technology, and the manufacturing cost can be reduced. Furthermore, in the present embodiment, instead of forming a combined type pressure gauge by preparing separately the capacitive diaphragm pressure gauge and the Pirani pressure gauge, both are formed by processing the same substrate, and, therefore, it is possible to omit useless spaces and to realize the miniaturization of the combined type pressure gauge.

Next, while referring to FIGS. 4A to 4F and FIGS. 5A to 5S, the manufacturing process of the combined type pressure gauge according to the present embodiment will be explained.

Figure 4A:
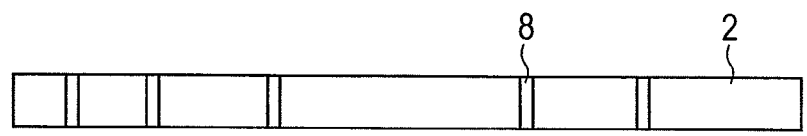
FIGS. 4A to 4F are drawings showing the manufacturing process of a combined type pressure gauge according to an embodiment of the present invention.
Figure 4B:
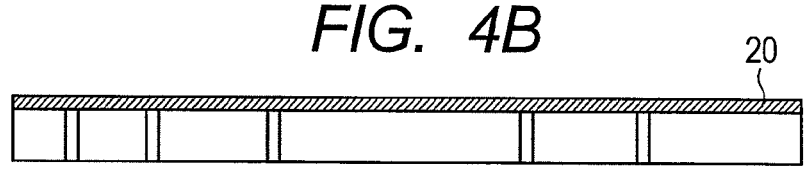
Figure 4C:
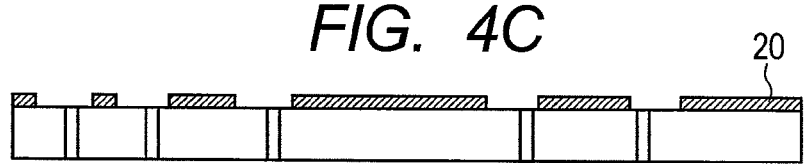
Figure 4D:
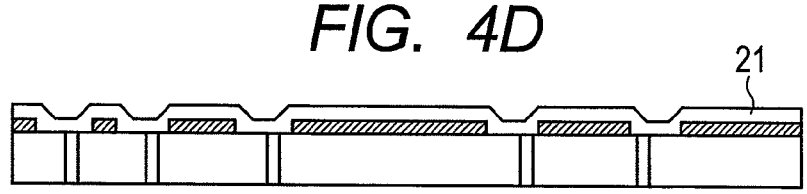
Figure 4E:
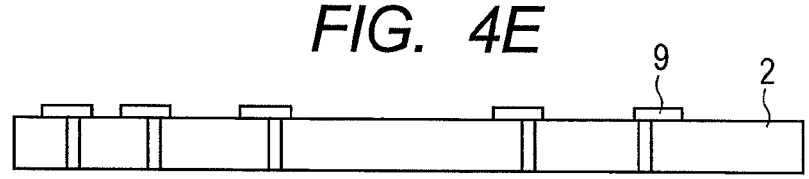
Figure 4F:
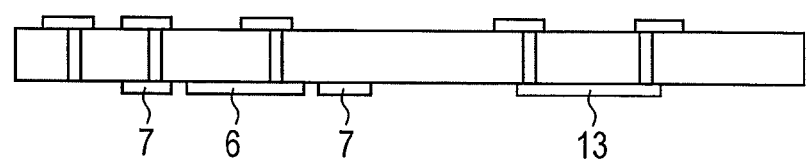

FIGS. 4A to 4F are drawings for explaining the process of processing the glass substrate 2. Here, the combined type pressure gauge is formed by using the MEMS technology capable of the miniaturization of elements at a several μm level. As the glass substrate 2, a PYREX substrate of Corning Incorporated or TEMPAX glass of SCHOTT AG (or an insulating substrate capable of being joined with Si), which has the feedthrough wirings 8 previously arranged at prescribed positions, is used (FIG. 4A). On the upper surface of the glass substrate 2, a resist 20 is coated (FIG. 4B), and the electrode pads 9 are patterned by a photolithographic technique (FIG. 4C). Then, over these, a metal film 21 is formed by sputtering, CVD, vacuum evaporation or the like (FIG. 4D) and, after that, the resist 20 is removed, which can form the pattern of the metal film 21 (electrode pads 9) on the upper surface of the glass substrate (FIG. 4E). By operations similar to these, on the lower surface of the glass substrate 2, too, the metal film can be formed (FIG. 4F). That is, on the lower surface of the glass substrate 2, the resist is coated, the pattern of the capacitance electrode 6, the reference electrode 7, and the temperature sensor 13 is formed on the lower surface, and the metal film is formed on the pattern to thereby form the capacitance electrode 6, reference electrode 7, and temperature sensor 13.

Specifically, the metal film on the upper surface of the glass substrate 2 constitutes the electrode pad 9, wherein Au/Cr or the like is included as the film material. Moreover, the metal film on the lower surface of the glass substrate 2 constitutes the capacitance electrode 6, the reference electrode 7, and the temperature sensor 13, wherein platinum, nickel, tungsten, and the like are preferable in consideration of the temperature coefficient of the resistivity of the temperature sensor 13, and, consequently, the electrode of the capacitive diaphragm pressure gauge and the temperature sensor of the Pirani pressure gauge can be formed collectively and simultaneously. Furthermore, when these metal films are required to be formed by different materials, they may be formed by separate processes.

Figure 5A:
FIGS. 5A to 5S are drawings showing the manufacturing process of a combined type pressure gauge according to an embodiment of the present invention.
Figure 5B:
Figure 5C:
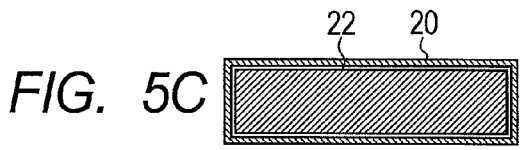
Figure 5D:
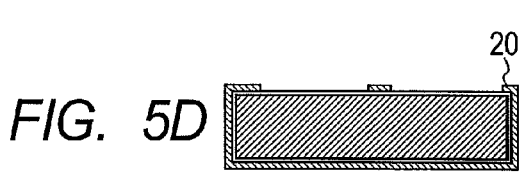
Figure 5E:
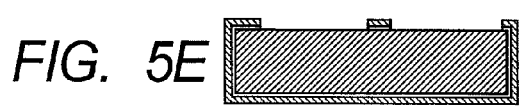
Figure 5F:
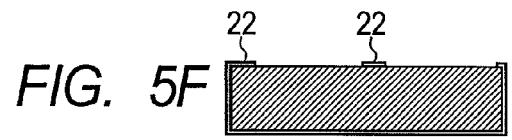
Figure 5G:
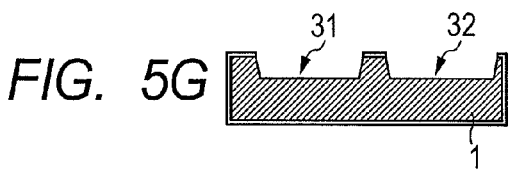
Figure 5H:
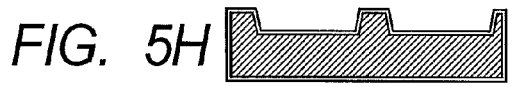
Figure 5I:
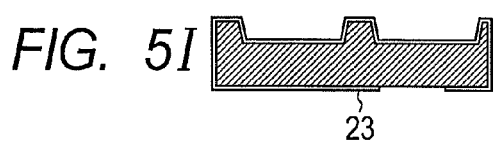
Figure 5J:
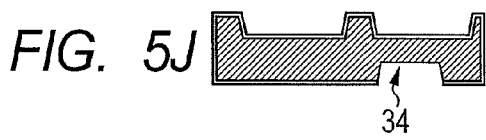
Figure 5K:
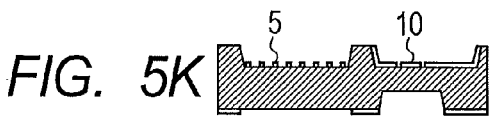
Figure 5L:
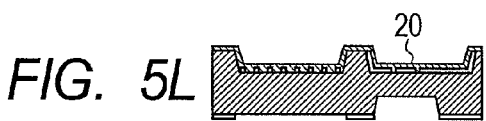
Figure 5M:

Next, by using FIGS. 5A to 5S, the process of processing the silicon substrate 1 will be explained. First, the silicon substrate 1 is a single crystalline silicon substrate commercially available, and one having a size of φ two inches to 12 inches corresponding to equipment to be used for the process is used (FIG. 5A). Moreover, one having a low resistivity of 0.1 Ω·cm or less is preferably used for giving the electroconductivity to the diaphragm 3, but, when ion implantation or impurity diffusion is employed for the diaphragm in the middle of the process, a silicon substrate of a low resistivity is not necessarily required to be used. Then, after forming a thermally-oxidized film 22 on the whole surface of the silicon substrate 1 (FIG. 5B), the resist 20 is coated on the whole surface (FIG. 5C), which is subjected to the patterning of the concave portion (first groove portion) 31 and the concave portion (second groove portion) 32 (FIG. 5D), and the thermally-oxidized film at prescribed positions is etched with hydrofluoric acid or the like (FIG. 5E).

Subsequently, while using the patterned oxidized film 22 as a mask, the silicon substrate 1 is etched to a prescribed depth by using chemicals such as potassium hydroxide (KOH) or tetramethylammonium hydroxide (TMAH), which can form simultaneously the first groove portion 31 of the capacitive pressure gauge and the second groove portion 32 of the Pirani pressure gauge at positions adjacent to each other (the interval between grooves is from 0.3 to 1.5 mm, preferably from 0.7 to 1 mm) (groove-forming step: FIG. 5G). Meanwhile, "carry out something simultaneously" here means to carry out a part or the whole thereof simultaneously.

Then, by thermally oxdizing the silicon substrate 1 to thermal oxidization or the like, the insulating film 23 is formed on the surface (or an insulating film such as an oxide film or a nitride film may be formed on the upper surface by CVD or the like) (insulating film-forming step: FIG. 5H).

Next, only a part of the insulating film 22 of the lower surface (second surface side) of the silicon substrate 1 is patterned for a concave portion (fourth grave part) 34 (the whole upper surface may be protected by a resist and etched by hydrofluoric acid or the like, or dry etching may be used for the patterning) (insulating film-patterning step: FIG. 5I).

Subsequently, while using the patterned insulating film 22 on the lower surface (second surface side) of the silicon substrate 1 as a mask, a part of the silicon substrate 1 is etched with the above-described etching chemical or dry-etched to form a fourth groove portion 34 (fourth groove-forming process: FIG. 5J). Meanwhile, the depth of the etching at this time (the depth of the fourth groove portion 34) has to be a depth that is suitable for feedthrough the substrate by carrying out the etching of FIG. 5Q to be described later.

Then, by patterning again the insulating film 22 on both upper and lower surfaces of the silicon substrate 1, the formation of the protruding structure 5 of the capacitive diaphragm pressure gauge 101, the patterning of the insulating film 10 of the Pirani pressure gauge 102, and the patterning of the insulating film 22 at a predetermined position to form the diaphragm of the lower surface (second surface side) of the silicon substrate 1 are carried out simultaneously (patterning step: FIG. 5K). Meanwhile, "carry out something simultaneously" here means to carry out a part or the whole thereof simultaneously.

Figure 5N:

Next, after coating the resist 20 on the upper surface (first surface side) of the silicon substrate 1 (FIG. 5L), the resist 20 is subjected to the patterning of the filament 11 and the electrode pad 12 (FIG. 5M), and the metal film 24 (nickel, platinum, tungsten or an alloy thereof) is formed over it by sputtering or vacuum evaporation (FIG. 5N).

Figure 5O:
Figure 5P:
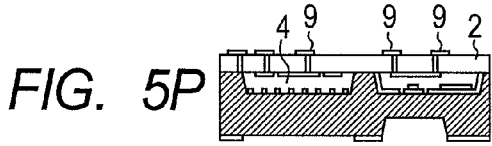

And, by removing the resist 20, the filament 11 and the electrode pad 12 on the insulating film can be formed in the Pirani pressure gauge portion (filament-forming step and electrode pad-forming step: FIG. 5O). Subsequently, from above thereof, the glass substrate 2 having completed in the process in FIG. 4 is bonded to the silicon substrate 1 so that the capacitance electrode 6 and the reference electrode 7 face the diaphragm 3 (joining step: FIG. 5P). The bonding process is carried out in a vacuum, and can be carried out by an anodic bonding in which the bonding is carried out while heating the substrate and applying a negative high voltage to the glass side, or by room-temperature bonding in which the substrate is not heated and the substrate surface is activated by Ar plasma in a vacuum to carry out directly the bonding. Moreover, by heating the substrate while carrying out the bonging, or by heating the substrate separately, etc., the non-evaporative getter (not shown) arranged inside the reference pressure chamber 4 is activated.

Figure 5Q:
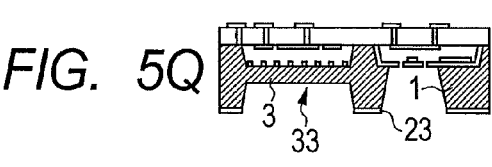
Figure 5R:
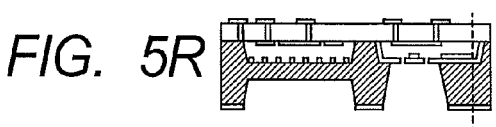
Figure 5S:
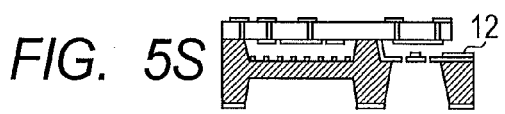

Next, the lower surface (second surface side) of the silicon substrate 1 is etched to a prescribed depth by aforementioned potassium hydroxide (KOH) or tetramethylammonium hydroxide (TMAH), or dry etching, by using the insulating film 23 as a mask. By forming the third groove portion 33 by the etching, the diaphragm 3 having a prescribed thickness is formed (diaphragm-forming step: FIG. 5Q). Simultaneously, the groove portion (fourth groove portion) 34 of the Pirani pressure gauge is penetrated from the lower surface (second surface side) of the silicon substrate 1 (through-hole-forming step: FIG. 5Q). As to the thickness of the diaphragm, for example, when a diaphragm has a size of 6.6 mm square, the diaphragm having a thickness of around 200 μm can form a diaphragm that is properly deflected in the pressure range of 1,000 to 100,000 Pa. Subsequently, by cutting a part of the upper glass by a dicer, and by cutting the outer side part thereof in the thickness of the whole substrate (FIG. 5R), it is possible to manufacture the combined type pressure gauge having a shape of the electrode pad 12 being exposed on the insulating film (FIG. 5S).

Meanwhile, in the combined type pressure gauge of the present invention, two kinds of pressure sensors having different operation principles are mounted. Therefore, respective electric circuits, wherein each outputs the capacitance information output by the capacitive diaphragm pressure gauge, and the resistance value information output by the Pirani pressure gauge (practically, the resistance value information is generally extracted efficiently by using a bridge circuit) as the pressure value, are necessary, and, by forming the electric circuit, too, on one circuit, the size reduction and the price reduction can be realized.

The order of respective steps in the manufacturing method of the combined type pressure gauge according to the present invention is not limited to the aforementioned order, but the order may be changed appropriately.

What is claimed is:

1. A manufacturing method of a combined type pressure gauge including a capacitive diaphragm pressure gauge and a Pirani pressure gauge, the manufacturing method comprising:

a groove-forming step of forming a first groove portion for forming a diaphragm of the capacitive diaphragm pressure gauge on a first surface side of a first substrate, and a second groove portion, which is positioned adjacent to the first groove portion, for forming a filament of the Pirani pressure gauge, on the first surface side of the first substrate, and a bonding step of bonding a second substrate having an electrode to the first substrate so as to at least cover the first groove portion on the first surface side of the first substrate, to seal hermetically the inside of the first groove portion and not to seal hermetically the inside of the second groove portion, wherein the second substrate is joined to the first substrate so that a surface of the second substrate where the electrode is formed faces a bottom surface of the first groove portion, the manufacturing method furthermore comprising the steps of:

forming a third groove portion in a region opposite to the first groove portion on a second surface side of the first substrate opposite to the first surface, before the groove-forming step, between the groove-forming step and the joining step, or after the joining step, and forming the filament in the second groove portion after the groove-forming step, and wherein the first groove portion and the third groove portion are formed so that a region between the bottom surface of the first groove portion and a bottom surface of the third groove portion constitutes the diaphragm.

2. The manufacturing method of a combined type pressure gauge according to claim 1, further comprising the steps of:

forming an insulating film on the bottom surface of the second groove portion and on the first surface side of the first substrate, before the step of forming the filament, and patterning the insulating film, before the step of forming the filament, and wherein, in the step of forming the filament, the filament is formed on the patterned insulating film.

3. The manufacturing method of a combined type pressure gauge according to claim 1, further comprising the step of forming a feedthrough penetrating into the second groove portion, on the second surface side of the first substrate, and wherein a part or the whole of the step of forming the third groove portion and the step of forming the through-hole are carried out simultaneously.

4. A combined type pressure gauge including a capacitive diaphragm pressure gauge having a diaphragm and a Pirani pressure gauge having a filament, comprising:

a first substrate, a first groove portion formed on a first surface side of the first substrate, a second groove portion which is formed on the first surface side of the first substrate and which is adjacent to the first groove portion, a third groove portion formed in a region opposite to the first groove portion on a second surface side opposite to the first surface of the first substrate, and a second substrate having an electrode, and wherein:

the second substrate is joined to the first substrate so as to at least cover the first groove portion, to seal hermetically the inside of the first groove portion, not to seal hermetically the inside of the second groove portion, and so that a surface of the second substrate where the electrode is formed faces a bottom surface of the first groove portion, a region between the bottom surface of the first groove portion and a bottom surface of the third groove portion constitutes the diaphragm, and the filament is formed in the second groove portion.

5. The combined type pressure gauge according to claim 4, further comprising a reference electrode provided on a surface of the second substrate, facing the first groove portion.

6. The combined type pressure gauge according to claim 4, further comprising a fourth groove portion formed in a region opposite to the second groove portion on the second surface side of the first substrate, and wherein a through-hole is formed between the second groove portion and the fourth groove portion.

7. The combined type pressure gauge according to claim 4, wherein:

the second substrate covers at least a part of the second groove portion, and the combined type pressure gauge further comprises a temperature sensor provided on a surface facing the second groove portion of the second substrate.

* * * * *